United States Patent [19]

Senior et al.

[11] Patent Number: 5,291,015
[45] Date of Patent: Mar. 1, 1994

[54] OPTICAL FIBRE SENSOR SYSTEM WHERE VARIATIONS IN TEMPERATURE OF OPTICAL SOURCE IS MINIMIZED OR EQUAL

[76] Inventors: John M. Senior, 31 High Grove Road, Cheadle, Cheshire, SK8 1NS; Ghulam Murtaza, 74 Barnes Meadows, Littleborough, Lancashire, OL15 9QD, both of United Kingdom

[21] Appl. No.: 773,924
[22] PCT Filed: Apr. 24, 1990
[86] PCT No.: PCT/GB90/00656
§ 371 Date: Dec. 16, 1991
§ 102(e) Date: Dec. 16, 1991
[87] PCT Pub. No.: WO90/13004
PCT Pub. Date: Nov. 1, 1990

[30] Foreign Application Priority Data

Apr. 26, 1989 [GB] United Kingdom ................ 8909593

[51] Int. Cl.$^5$ ................................................ G02B 5/14
[52] U.S. Cl. ................................ 250/227.23; 250/226
[58] Field of Search ............. 250/227.23, 226, 231.13, 250/231.19; 324/96, 350

[56] References Cited

U.S. PATENT DOCUMENTS

| | | | |
|---|---|---|---|
| 4,249,076 | 2/1981 | Bergstrom et al. | 250/227.23 |
| 4,270,050 | 5/1981 | Brogardh | 250/227.23 |
| 4,281,245 | 7/1981 | Brogardh et al. | 250/227.23 |
| 4,417,140 | 11/1983 | Adolfsson et al. | 250/227.23 |
| 4,514,860 | 4/1985 | Adolfsson et al. | 250/227.23 |
| 4,529,875 | 7/1985 | Brogardh et al. | 324/96 |
| 4,560,868 | 12/1985 | Brogardh et al. | 250/227.23 |
| 4,743,119 | 5/1988 | Ida | 356/375 |

FOREIGN PATENT DOCUMENTS 2034460 9/1979 United Kingdom.
2141541 6/1984 United Kingdom.

OTHER PUBLICATIONS

Engineering Optical Fibre Sensors for Process Control, Wallace et al., published 1984, pp. 129-134.
Fiber-optic Instrument for Temperature Measurement, Kyuma et al., published Apr. 1982, pp. 676-679.

*Primary Examiner*—David C. Nelms
*Assistant Examiner*—Stephone B. Allen
*Attorney, Agent, or Firm*—Rockey, Rifkin and Ryther

[57] ABSTRACT

An optical fibre sensor system comprising a transmitter, a receiver and a sensor interconnected by an optical link. An optical source at the transmitter transmits to the sensor via the optical link two optical signals at different wavelengths. The sensor transmits to the receiver via the optical link measurement and reference signals, the measurement signal being derived by modulating the intensity of one of the two optical signals in dependence upon a parameter monitored by the sensor and the reference signal having an intensity which has a predetermined relationship with the intensity of the other optical signal. The receiver compares the intensities of the measurement and reference signals to derive a measure of the monitored parameter. The two wavelengths are selected such that changes in the intensities of the optical signals resulting from variations in the temperature of the optical source are minimised or are of substantially equal magnitude for both the optical signals.

6 Claims, 3 Drawing Sheets

Elative Int % v Wavelength (nm)   (1 nm)

Elative Int % v Wavelength (nm)   (1 nm)

OPTICAL FIBRE SENSOR SYSTEM WHERE VARIATIONS IN TEMPERATURE OF OPTICAL SOURCE IS MINIMIZED OR EQUAL

The present invention relates to an optical fibre sensor system in which a parameter is monitored by a sensor providing a measurement signal output in the form of an optical signal the intensity of which is a function of the monitored parameter.

Dual wavelength intensity modulation sensors are known. One wavelength is used for the transmission of a measurement signal and the other wavelength is used for the transmission of a reference signal. The measurement signal intensity is modulated in accordance with the monitored parameter whereas the reference signal intensity is independent of the monitored parameter. Ideally such a system should be configured such that any extraneous intensity effects proportionally affect both the measurement and the reference signal. If this is the case a ratio of the two optical signals provides a fully referenced output independent of such extraneous intensity effects In one known system (K. Kyuma, S. Tai, T. Sawabe and M. Nunoshita, "Fiber optic instrument for temperature measurement", IEEE J. Quantum Electron., Vol. QE-18, pp. 676-679, 1982) the optical absorption of a thin semiconductor material is temperature dependent at one wavelength and almost transparent at another. Optical emissions from two LEDs operating at these two wavelengths were coupled together and transmitted through the system. The output signal of the temperature dependent light wave normalised by that of the reference light and the ratio was therefore dependent on the absorption spectrum of the semiconductor material.

A somewhat similar referencing technique again using two LEDs emitting at different wavelengths has been proposed (P. R. Wallace, E. S. R. Sikora and A. J. Walkden, "Engineering optical fibre sensors for process control", GEC J. of Research Vol. 2, pp. 129-134, 1984). In this system the individual wavelength optical signals are reflected back both before and after a fibre microband sensor. The optical signal reflected before the sensor functions as the reference signal whilst the optical signal modulated by the microbending sensor provides the measurement signal.

A problem with all of the devices referred to above is that they employ two separate LED sources to produce the reference and measurement signals. Consequently unequal spectral shift, or output power fluctuations, in the LED sources can create problems within the sensor system and hence invalidate the referencing. In particular, it has been found that the normalised output power of LEDs is highly temperature dependent and thus unless compensation for optical source temperature is provided the true relationship between the measurement and reference signals cannot be predicted and thus sensor system calibration is inaccurate.

It is an object of the present invention to provide an optical fibre sensor system which obviates or mitigates the problems outlined above.

According to the present invention there is provided an optical fibre sensor system comprising a transmitter, a receiver and a sensor interconnected by an optical link, wherein the transmitter comprises an optical source arranged to transmit to the sensor via the optical link two optical signals at different wavelengths, the sensor is arranged to transmit to the receiver via the optical link measurement and reference signals, the measurement signal being derived by modulating the intensity of one of the two optical signals in dependence upon a parameter monitored by the sensor and the reference signal having an intensity which has a predetermined relationship with the intensity of the other optical signal, and the receiver is arranged to compare the intensities of the measurement and reference signals to derive a measure of the monitored parameter, characterised in that the two wavelengths are selected such that changes in the intensities of the optical signals resulting from variations in the temperature of the optical source are minimised or are of substantially equal magnitude for both the optical signals.

The transmitter may comprise a single LED, in which case filters are provided to select from the LED output the two wavelengths or a pair of LEDs each associated with a respective filter to provide the two wavelengths. The filters may be provided at the transmitter, the sensor, the receiver or at any part of the optical link therebetween.

Preferably the optical link comprises one or more optical fibres. The sensor may be of any convenient form, for example a movement sensor comprising a mirror the position of which modulates the measurement signal and a fixed optical component which returns a reference signal of constant intensity to the receiver.

In the case of a single LED optical source, a plot of the relative intensity versus wavelength of the source over a range of temperatures will produce a family of curves. The maximum and minimum predicted operating temperatures will produce two limiting curves. For these curves the wavelengths are selected such that at those wavelengths the change in relative intensity from one curve to the other is the same, and hence it will be the same for the family of curves over the full temperature range. If the curves are of an appropriate shape it might be possible to select more than one pair of wavelengths having the desired property of equal changes in relative intensity at both of the wavelengths.

In a two LED system, a relative intensity versus wavelength plot over a range of temperatures will again produce a family of curves. Limiting cases also exist at the maximum and minimum operating temperatures. Again, the selected wavelength for the operation of the LED could be at points at which the two limiting curves intersect and hence the family of curves intersect.

Embodiments of the present invention will now be described, by way of example, with reference to the accompanying drawings, in which.

Figure 1:
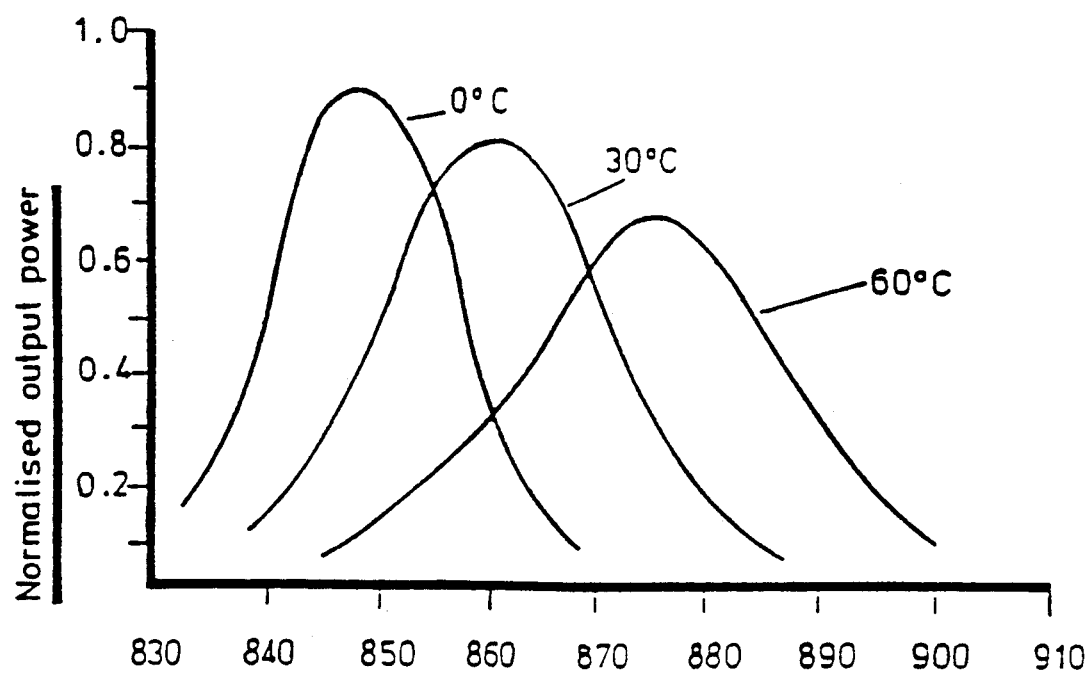
FIG. 1 is an illustration of a typical spectral variation of the output characteristic with temperature of a surface emitting LED.

Referring to FIG. 1 this shows the large variations in the spectrum of the output characteristic of a surface emitting LED with temperature. The left-most curve is that obtained at 0° C., the central curve is that obtained at 30° C., and the right-most curve is that obtained at 60° C. Clearly if one was to select frequencies of 840 NM and 890 NM as the frequencies for a dual wavelength sensor system the relative intensities of these two frequencies would change radically as the LED temperature increased. It is essential for some method of compensation to be provided for such temperature variations.

Figure 2:
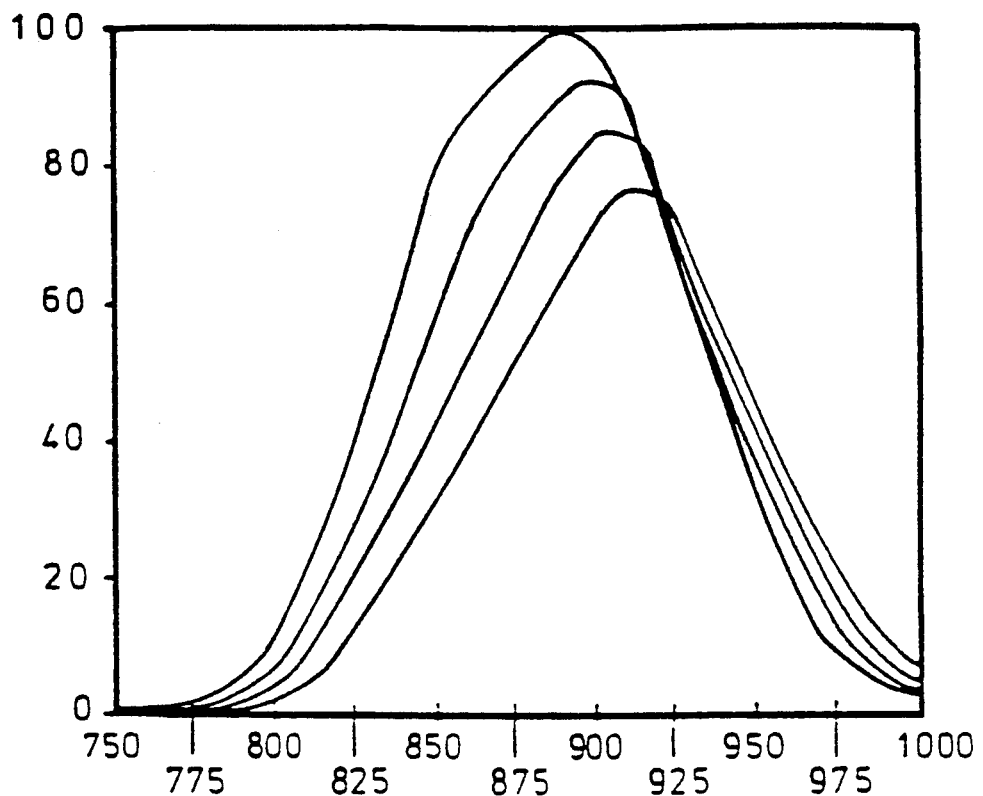
FIG. 2 illustrates the variation of relative intensity with temperature of an LED output spectrum.

FIG. 2 illustrates four curves each illustrating the relative intensity versus wavelength for a respective temperature in one LED device. Different LED devices will have different characteristics. In the illustrated example, it will be seen that all four curves come together at a wavelength of approximately 925 NM and that the four curves are substantially parallel in the range roughly between 850 NM and 900 NM. Such a characteristic is one example of a characteristic which makes it possible to automatically compensate for temperature variations in the optical source of an embodiment of the present invention.

Figure 3:
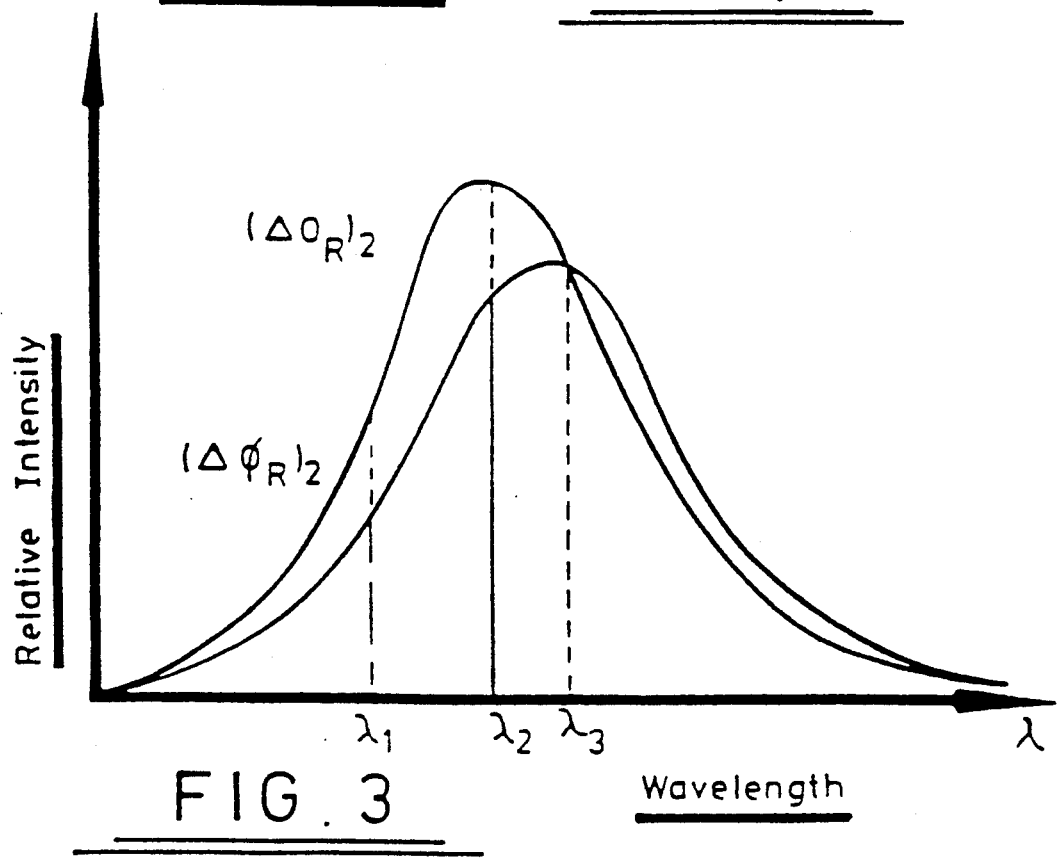
FIG. 3 illustrates the selection of frequencies in accordance with the present invention on the basis of a relative intensity versus wavelength relationship obtained for a particular LED device.

In a first embodiment, the system would use a single LED source to provide both the measurement and reference signals. As illustrated in FIG. 3 which shows two curves each corresponding to a respective temperature for the LED a first (measurement) wavelength $\lambda_1$ would be selected and a second (reference) wavelength $\lambda_2$ would be selected. In such a system any variations in temperature within the range indicated by the two curves would not substantially affect the intensity of one signal relative to the other. Thus the system could be operated with confidence without regard to optical source temperatures.

As an alternative, if two LED sources were used, the wavelength $\lambda_3$ could be selected for one of the reference and measurement signals. Given that the two curves intersect at that wavelength changes in relative intensity resulting from temperature variations would be negligible. Providing the other signal was produced by a different optical source having a similar shaped relative intensity versus wavelength characteristic intersecting at a different wavelength again the system could be operated without reference to the optical source temperature.

Figure 4:
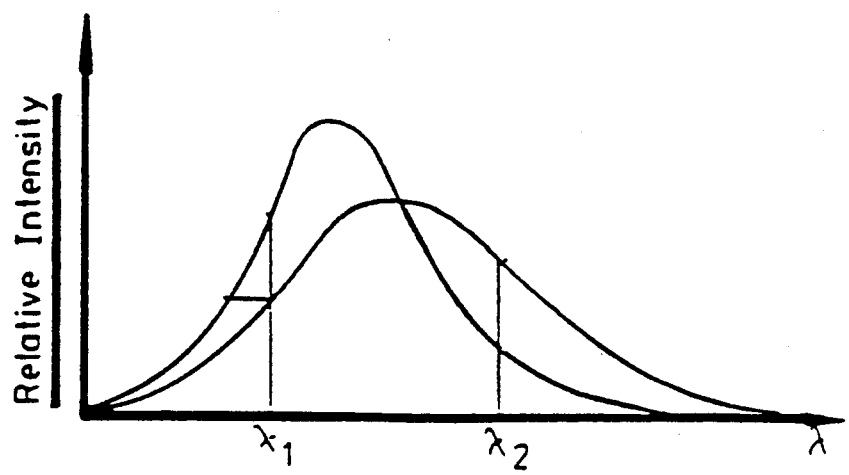
FIG. 4 illustrates a relative intensity versus wavelength relationship of a different form from that shown in FIG. 3 again showing the selection of frequencies in accordance with the present invention.

FIG. 4 illustrates the relative intensity versus wavelength characteristic for a different LED source to those illustrated in FIGS. 2 and 3. The two curves correspond to the relative intensity at a first (maximum expected) temperature and a second (minimum expected) temperature. It will be seen that the wavelengths $\lambda_1$ and $\lambda_2$ could be selected to provide changes in relative intensity of equal magnitude but opposite sign. In such an arrangement the receiver circuitry would be adapted to take account of the opposite sign of the changes in relative intensity but otherwise would operate in exactly the same manner as the single LED source embodiment described with reference to FIG. 3.

Figure 5:
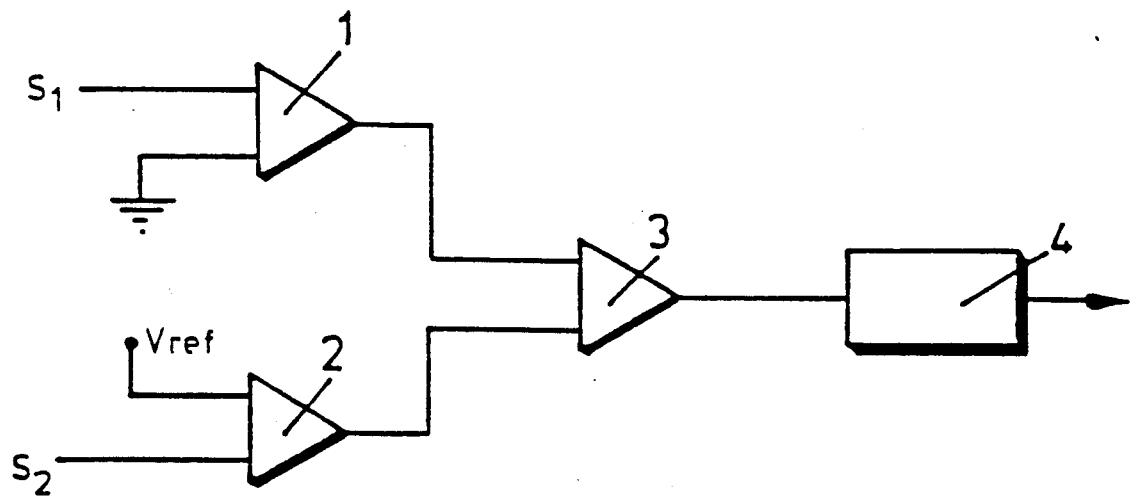
FIG. 5 is a block diagram illustrating the first stage in signal processing for an LED having the characteristics illustrated in FIG. 4.

FIG. 5 illustrates a first stage signal processor for processing measurement and reference signals derived from a single LED at wavelengths $\lambda_1$ and $\lambda_2$, the LED having the characteristic illustrated in FIG. 4. The two signals S1 and S2 are applied to respective differential amplifiers 1, 2 arranged as shown such that the outputs respond to temperature similarly. Amplifier 1 has a grounded input, amplifier 2 a reference input Vref which is greater than the maximum S2 signal. A further amplifier 3 provides a referenced output to a signal scaling circuit 4.

Thus the present invention provides an extremely simple but elegant solution to the problem of temperature compensation in dual wavelength optical sensor systems. To put the invention into effect it is merely necessary to derive information of the type illustrated in FIGS. 2, 3 and 4 and select appropriate frequencies by the use of simple band pass filters. Such filters could be positioned adjacent the optical source, the sensor or at the receiver, or at any point in the optical link therebetween.

We claim:

1. An optical fibre sensor system comprising a transmitter, a receiver and a sensor interconnected by an optical link, wherein the transmitter comprises an optical source arranged to transmit to the sensor via the optical link two optical signals at different wavelengths, the sensor is arranged to transmit to the receiver via the optical link measurement and reference signals, the measurement signal being derived by modulating the intensity of one of the two optical signals in dependence upon a parameter monitored by the sensor and the reference signal having an intensity which has a predetermined relationship with the intensity of the other optical signal, and the receiver is arranged to compare the intensities of the measurement and reference signals to derive a measure of the monitored parameter, characterised in that the two wavelengths are selected such that changes in the intensities of the optical signals resulting from variations in the temperature of the optical source are minimised or are of substantially equal magnitude for both the optical signals.

2. A sensor system according to claim 1, wherein the transmitter comprises a single LED and filters are provided to select from the LED output the two wavelengths.

3. A sensor system according to claim 1, wherein the transmitter comprises a pair of LEDs each associated with a respective filter to provide the two wavelengths.

4. A sensor system according to claim 2, wherein the said frequencies are selected such that, if two curves are produced by plotting the relative intensity versus wavelength of the source at maximum and minimum predicted operating temperatures, the change in relative intensity from one curve to the other at the selected frequencies is the same.

5. A sensor according to claim 4, where the magnitude of the intensity changes with respect to temperature are the same but of opposite sign.

6. A sensor system according to claim 3, wherein for each LED, the respective frequency is selected such that, if a relative intensity versus wavelength plot at maximum and minimum operating temperatures is produced, the two curves intersect at the selected frequency.

* * * * *